(12) United States Patent
Visosky

(10) Patent No.: US 9,485,414 B2
(45) Date of Patent: Nov. 1, 2016

(54) EYE CONTACT ENABLING DEVICE FOR VIDEO CONFERENCING

(71) Applicant: John Visosky, Gormley (CA)

(72) Inventor: John Visosky, Gormley (CA)

( * ) Notice: Subject to any disclaimer, the term of this patent is extended or adjusted under 35 U.S.C. 154(b) by 0 days.

(21) Appl. No.: 14/707,766

(22) Filed: May 8, 2015

(65) Prior Publication Data

US 2015/0373303 A1    Dec. 24, 2015

Related U.S. Application Data

(60) Provisional application No. 62/015,174, filed on Jun. 20, 2014.

(51) Int. Cl.
  *H04N 7/14* (2006.01)
  *H04N 5/232* (2006.01)
  *G06K 9/00* (2006.01)

(52) U.S. Cl.
  CPC ...... *H04N 5/23219* (2013.01); *G06K 9/00281* (2013.01); *H04N 7/144* (2013.01); *G06K 2209/21* (2013.01)

(58) Field of Classification Search
  None
  See application file for complete search history.

(56) References Cited

U.S. PATENT DOCUMENTS

| | | | | |
|---|---|---|---|---|
| 7,136,090 B1* | 11/2006 | McDuffie White | .... | G03B 15/10 348/14.08 |
| 7,209,160 B2* | 4/2007 | McNelley | ............. | H04N 7/144 348/14.08 |
| 2008/0278516 A1* | 11/2008 | Santon | ................... | H04N 7/144 345/619 |
| 2008/0297587 A1* | 12/2008 | Kurtz | ................ | G06K 9/00335 348/14.08 |
| 2008/0297589 A1* | 12/2008 | Kurtz | ..................... | H04N 7/147 348/14.16 |
| 2009/0079812 A1* | 3/2009 | Crenshaw | ................ | H04N 7/15 348/14.01 |
| 2011/0292364 A1* | 12/2011 | Kawamura | ............. | G02B 7/08 355/55 |
| 2012/0169838 A1* | 7/2012 | Sekine | ..................... | H04N 7/15 348/14.16 |
| 2012/0201528 A1* | 8/2012 | Aoki | ................. | H04N 13/0239 396/325 |

* cited by examiner

*Primary Examiner* — Maria El-Zoobi
(74) *Attorney, Agent, or Firm* — Sheridan Ross P.C.

(57) ABSTRACT

A device and system can physically position a camera lens between the eyes of the image of the person onscreen in a video conference. To position the lens, a mechanical device may position or move the camera lens. The mechanical device can include a movable armature that can move a small camera head (i.e., a lens with or without supporting electronics) from a first position of the computer monitor (e.g., the frame of the monitor) to a second position onscreen. The second position can place the lens near or over the image of the other party, for example, between the eyes of the onscreen image of the other party.

20 Claims, 12 Drawing Sheets

EYE CONTACT ENABLING DEVICE FOR VIDEO CONFERENCING

CROSS REFERENCE TO RELATED APPLICATION

The present application claims the benefits of and priority, under 35 U.S.C. §119(e), to U.S. Provisional Application Ser. No. 62/015,174, filed Jun. 20, 2014, entitled "MAKING EYE CONTACT"; which is incorporated herein by this reference in its entirety for all that it teach and for all purposes.

BACKGROUND

Traditional webcams for face-to-face video conferencing, on a computer, are customarily placed above, below, or occasionally to the sides of the participant's computer monitor. As a result of the placement of the webcam, the video image of the participant as seen by the other party does not appear to be looking directly at the other party. This offset is due to the participant looking at the on-screen image of the other party, which is typically located some distance from the webcam. For example, when the webcam is placed above the participant's monitor, the other party sees the participant looking down.

Video conferencing participants can avoid this problem by looking directly at the camera, but this is very unnatural, as the normal conversational impulse is to look at the face of the person to whom one is speaking Therefore, the usual situation in video conferencing is that the participants see each other but do not look into each other's eyes—they do not make eye contact. This lack of eye contact actually makes videoconferencing less effective. Thus, there is a need to conduct videoconferences where the users can establish eye contact and still view the other party.

SUMMARY

The solution to the above and other problems is to align the camera lens or adjust the focal point of a person with the eyes of the image of the other party presented on the computer monitor. In this way, when looking at the onscreen image, the user can make eye contact and the other party sees the participant as looking directly out of the screen at them. If both parties are using such a device, eye contact is established. If only one party is using the device, that party will look "normal" to the other party and appear to be making eye contact, while he is looking at the face, but not directly into the eyes, of the non-device using participant. Thus, users of the device will look more natural to non-users of the device.

The eye contact-enabling device(s) can use many techniques to cause the camera lens to be, or appear to be, onscreen where the other party's eyes are located. The techniques can include, but are not limited to, the processes and devices described hereinafter. For example, a camera lens can be physically positioned between the eyes of the image of the person onscreen. A mechanical device may position the camera lens. The mechanical device can include a movable armature that can move a small camera head (i.e., a lens with or without supporting electronics) from a first position of the computer monitor (e.g., the frame of the monitor) to a second position onscreen. The second position can place the lens near or over the image of the other party, for example, between the eyes of the onscreen image of the other party.

In the case where the arm can only move the lens to a predetermined and fixed position onscreen, facial recognition software can automatically position the onscreen image under or near the lens of the camera. In other situations, the armature may be able to sweep through an arc that covers the entire screen from side-to-side or top-to-bottom. Further, the armature may be extendable or telescope to move the lens to any position over the monitor. The armature can be made of transparent plastic to minimize its obtrusiveness to the onscreen image. The overall effect would be a small dot between the eyes of the other party, which would become quickly unnoticeable, like glasses worn by the other party. An example mechanical device can include a movable arm with a lens and light pipe; the electronics could be embedded in the monitor frame.

With a moveable-arm device, the system software and/or the video conferencing application software can determine the current position of the camera. The determination can be accomplished with limit switches at each end of the rotation arc or with other sensors. When one or the other of the switches is engaged, this means that the camera is in either the 'normal' or 'eye contact' position. The software can rotate the image from the lens to keep the image upright as seen by the other party. When neither limit switch is engaged, the camera can be "in transition" between the two positions, and the video stream can be frozen at the last captured frame. In this way, the other party will not see a "tilting" image while the device is adjusting the position of the camera.

The "USB Device Class Definition for Video Devices" defines a 'Roll' control that may be used to communicate the video information to the system, in the cases where a USB interface is used. A more advanced device might use a tilt sensor embedded in the camera head (rather than simply limit switches) to communicate the exact rotational position to the system software. This sensor information can allow for continuous adjustment of the transmitted image to keep it in the upright orientation.

Similar in concept to the integrated moveable-arm camera, there could also be a stand-alone, "monitor-top" version, like a standard webcam, but with a movable arm containing the lens that could be swung down in front of the monitor.

Another variation of the device can include an armature that could vary the length of the armature using a combination of gears, motors, solenoids, etc., and a motorized rotation axis, such that the camera could be moved to a wide variety of positions on the screen. Facial recognition software could be used to determine the best position for the camera based on where the user is looking. This variable-position camera would be especially helpful for video conferences with a number of participants in one location, where the camera could be positioned onto the face of the person currently speaking.

A further variation on this concept, especially useful for large displays such as used in video conferencing meeting rooms, can include mounting the mechanical housing for the variable-length arm on a horizontal track above (or below) the display, allowing for rapid movement of the camera to any point of the display. For devices where the camera position can be controlled by the system software, the "USB Device Class Definition for Video Devices" can be extended to allow for additional control outputs and sensor inputs.

Another means of achieving eye contact would be software-corrected "virtual lenses," where two or more cameras may be placed or embedded into the perimeter (e.g., left and right sides) of the monitor frame. The cameras can capture multiple instances of the participant's image, and real-time software can combine the multiple perspectives into a single, forward-looking image. The virtual lens software can include specialized facial-recognition algorithms to locate the eyes and to appropriately combine the lateral perspectives of the pupils and whites to create a natural look.

Still another example apparatus for achieving eye contact can be an embedded camera lens in the monitor or display screen. The embedded camera can be placed within the field of LED or pixels forming the screen. The embedded camera can capture an image by alternately (a) making the pixels in front of the lens transparent (or blanking them), so the camera could capture the image of the participant, and (b) making the pixels non-transparent (or illuminating them), so the pixels could display the image of the other party. The alternation between blanking and illuminating the pixels can be at a high enough frequency, e.g., above 120 changes per second, to be invisible to the eye. Alternatively, a minute 'hole' of non-illuminated pixels may be formed when the embedded camera is in use.

A variation of the embedded camera apparatus can include several image sensors placed behind a portion or the entire display surface. The portion of the display having image sensors could then be alternately blanked or illuminated. This alternative could allow the 'active' portion of the camera to be taken from any position on the display, or at least the portion with the image sensors. Facial recognition software can then determine the correct position of the image or which image sensors to use for the image. A similar result can also be achieved by a dual-axis positioning system to move the camera head behind the display glass to any position, and then the system can blank the appropriate pixels to allow the camera to capture the image.

In some situations, after manually rotating a moveable-arm camera into position, the user could be required to manually position the video conferencing window such that the camera is placed between the eyes of the remote user. In other situations, the user could be asked to move the armature with the camera over the image on the screen. However, to achieve the best user experience, a variety of software enhancements can ensure the correct positioning of the camera relative to the onscreen image.

In the discussions that follow, the term "local user" means the person who is using an eye contact-enabling device, and the term "remote user" means the person (or persons) with whom the local user is talking to via video conferencing. The remote user may, or may not, also be using an eye contact-enabling device. Generally, the ideal positioning of the camera lens (i.e. "between the eyes") may be achieved by: a) moving the onscreen image (by moving the position of the video window, or the position of the image within the window); b) by moving the camera, in cases where camera movement is software controlled; or, c) by an optimized combination of window movement and camera movement.

Furthermore, some degree of rate-dependent hysteresis should be applied to these adjustments, to avoid unnecessary movements when such adjustments would be transitory in nature. For example, if someone briefly turns their head, or glances elsewhere, the system should not immediately make adjustments, but instead wait until it is clear that the change will persist. This delay would likely be on the order of a few seconds, and the delay itself may be dynamically computed to adjust for cases where changes are relatively continuous. For example, someone walking while looking into their camera phone might cause a constantly 'bobbing' image—the software could detect this and avoid making adjustments constantly (allowing the image to bob). The user could also have some input to this, perhaps in the form of an adjustable "stability control", which they could adjust to their own comfort level and according to the nature and quality of the video stream being received. For example, using the case of a 'bobbing' image, a stability control setting of zero might allow the image to bob exactly as the image is received, while a setting of 100% may completely eliminate the bobbing.

When the system determines that eye contact alignment movements are required, they should be done with a smooth transition that brings the camera and image into the required alignment at a smooth rate rather than a rapid or instantaneous jump. In the case where a motorized camera must be moved, such a transition may involve a period of acceleration, followed by a period of smooth movement, followed by deceleration to the final location. Where the onscreen image is moved, a similar movement profile could be followed. Some experimentation may be required to determine the most natural-feeling transitions.

In some cases (and where the hardware allows it) a combination of physical camera movement combined with image movement may achieve the best results. This situation would be especially true in the case where both the local and remote user are using eye contact-enabling devices, and the devices are in communication with each other.

Facial detection software can be used to identify the location of a person's face (or several faces) in an image. This type of software is a common feature of many digital cameras, for example, where it is used to assist focusing and framing of a shot. For the purposes of enabling eye contact, facial detection can be used in two ways. First, facial detection can be used to find the location of the remote user's face to allow the software, which has knowledge of the location of the local camera lens relative to the display, to correctly position the onscreen image of the remote user such that the camera lens is between the remote user's eyes. Second, facial detection can be used to detect and examine the remote and local user's faces, for pupil and gaze detection.

Once the position of a face, and the eyes within the face, have been detected, software can be used to examine a person's pupils, and from that examination detect the direction of the person's gaze. If the gaze is "direct", it means the person is looking at the camera. If the person's gaze is "offset", it means the person is not looking at the camera. In the case of a remote user's gaze being consistently indirect, this situation is a good indication that the remote user is not using an eye contact-enabling device. In the case where a user (local or remote) is using an eye contact-enabling device, an indirect gaze may indicate that the person is looking at someone else in the onscreen image than the user who is currently engaged for eye contact. The software can use this information to re-position the camera to a different location relative to the screen, to re-establish eye contact.

For dual-camera devices, information about the distance to the user's face can be used to better analyze and compose the images, and to assist with pupil and gaze detection. Techniques, such as sonar ranging, may be used to supply this information to the software. This technique would, of course, require that a sonar emitter/detector device be placed, ideally in the plane of the display, or at some known offset from it. In the case of a dual-camera system, image analysis may provide a computed distance.

In the case where there are multiple users in a single location, and all of them can be seen onscreen, it may be desirable to identify the current speaker, for the purposes of determining the correct eye contact location for that speaker. Speaker identification may be done in a variety of ways. One mechanism would be manual—the user could simply click on the image of the current speaker to establish eye contact. Speaker identification can also be done with image analysis. For example, detecting mouth movement may be sufficient to establish the current speaker. Another technique for speaker identification could be the use of audio information. This technique would work best in a dedicated video conferencing setup, where multiple microphones could be placed within the room, and analysis of the relative delay of sounds arriving at each microphone could be used to compute the location of the speaker within the room. This information, combined with knowledge of the placement of the camera(s) and display(s) could be used to determine the eye contact location for the speaker. The identification of a user with local devices (such as microphones) may include the transmission of the local device information to the remote location, for correct eye contact alignment via image or camera movement.

The local device information may be formatted or arranged according to a standard or new protocol, referred to generally as the "Eye Contact Protocol." When both sides of the video conference are using eye contact-enabling devices, or are at least using software that is eye contact-aware, messaging between the two locations via an Eye Contact Protocol can enable the optimum user experience. The Eye Contact Protocol could be transmitted via a separate data connection or embedded in the video or audio stream. The Eye Contact Protocol can transmit information such as: the currently speaking user; the type, number, and location of cameras, displays, microphones, speakers; commands to re-position moveable devices; etc. The specification of the Eye Contact Protocol may be done through a standards organization to ensure interoperability across multiple manufacturer's devices.

Aspects of the embodiments include a method for conducting a video conference comprising: a computing system receiving an image of a distant user involved in the video conference; a processor of the computing system determining a position on the image associated with a focal point of a local user involved in the video conference; a processor determining where the position is located on a display of the computing system; adjusting an acquisition of a second image of the local user to cause the local user to appear to focus on the focal point while conducting the video conference; and sending a representation of the second image to the distant user.

Aspects of the above method further comprise wherein the image of the distant user is of the distant user's face including eyes of the distant user.

Aspects of the above method further comprise wherein the position is a location between the eyes in the face of the distant user.

Aspects of the above method further comprise further comprising the processor executing a facial recognition module to determine the location.

Aspects of the above method further comprise wherein the location is substantially midway between the pupils of the eyes of the distant user.

Aspects of the above method further comprise wherein adjusting the acquisition of the second image comprises locating an image capture device in physical proximity to the focal point.

Aspects of the above method further comprise wherein locating the image capture device in physical proximity to the focal point comprises one of locating and moving the image of the distant user over the image capture device.

Aspects of the above method further comprise wherein the image capture device is embedded in the display of the computing system.

Aspects of the above method further comprise wherein locating the image capture device in physical proximity to the focal point comprises moving an armature coupled to the image capture device to position the image capture device over the focal point.

Aspects of the above method further comprise wherein moving the armature comprises: rotating a hub at a first end of the armature to swing the armature through an arc over the display device; and extending a telescoping member of the armature.

Aspects of the above method further comprise wherein adjusting an acquisition of a second image of the local user comprises: obtaining a third image from a first lens of the image capture device and a fourth image from a second lens of the image capture device; and generating a composite image from the third and fourth images such that the composite image appears to focus on the focal point.

Aspects of the embodiments also include a computing system configured to conduct a video conference, the computing system comprising: a network connection configured to: receive a first image of a distant user involved in the video conference, send a representation of a second image, of a local user, to the distant user; a display configured to display the first image; an image capture device configured to: capture the second image; a processor configured to: determine a position on the first image associated with a focal point of the local user involved in the video conference, determine where the position is located on the display, and adjust an acquisition of the second image of the local user to cause the local user to appear to focus on the focal point while conducting the video conference.

Aspects of the above computing system further comprise wherein the image of the distant user is of the distant user's face including eyes of the distant user, wherein the position is a location between the eyes in the face of the distant user, wherein the location is substantially midway between pupils of the eyes of the distant user, wherein the processor is further configured to execute a facial recognition module to determine the location.

Aspects of the above computing system further comprise wherein the image capture device is embedded in the display of the computing system, and the processor is configured to: locate the image capture device in physical proximity to the focal point by one of locating and moving the first image of the distant user over the image capture device.

Aspects of the above computing system further comprise wherein the image capture device comprises an armature configured to locate a lens of the image capture device in physical proximity to the focal point.

Aspects of the above computing system further comprise wherein the armature comprises: a hub coupled to a first end of the armature, the hub configured to swing the armature through an arc over the display device; and a telescoping member coupled to the hub, the telescoping member configured to extend a second end of the armature over a distance, wherein the lens is coupled to the second end of the armature.

Aspects of the above computing system further comprise wherein adjusting an acquisition of a second image of the local user comprises: obtaining a third image from a first lens of the image capture device and a fourth image from a second lens of the image capture device; and generating a composite image from the third and fourth images such that the composite image appears to focus on the focal point.

Aspects of the embodiments also include a non-transitory computer readable medium stored with instructions stored thereon that cause a computing system configured to execute a method for conducting a video conference, the method comprising: receiving an image of a distant user involved in the video conference; determining a position on the image associated with a focal point of a local user involved in the video conference; determining where the position is located on a display of the computing system; adjusting an acquisition of a second image of the local user to cause the local user to appear to focus on the focal point while conducting the video conference.

Aspects of the above computer readable medium further comprise wherein the image of the distant user is of the distant user's face including eyes of the distant user, wherein the position is a location between the eyes in the face of the distant user, wherein the location is substantially midway between the pupils of the eyes of the distant user, wherein adjusting the acquisition of the second image comprises locating an image capture device in physical proximity to the focal point.

Aspects of the above computer readable medium further comprise wherein the image of the distant user is of the distant user's face including eyes of the distant user, wherein the position is a location between the eyes in the face of the distant user, wherein the location is substantially midway between the pupils of the eyes of the distant user, wherein adjusting an acquisition of a second image of the local user comprises: obtaining a third image from a first lens of the image capture device and a fourth image from a second lens of the image capture device; and generating a composite image from the third and fourth images such that the composite image appears to focus on the focal point.

The present disclosure can provide a number of advantages depending on the particular aspect, embodiment, and/or configuration. The advantages include providing a natural human interaction on a video conference, where eye contact can be created or simulated. Thus, better non-verbal communication can enhance the video conference and make the medium more effective for communication ideas. These and other advantages will be apparent from the disclosure.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium," as used herein, refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The term "media" or "multimedia," as used herein, refers to content that may assume one of a combination of different content forms. Multimedia can include one or more of, but is not limited to, text, audio, still images, animation, video, or interactivity content forms.

The terms "determine," "calculate" and "compute," and variations thereof, as used herein, are used interchangeably and include any type of methodology, process, mathematical operation or technique.

The term "display" refers to a portion of one or more screens used to display the output of a computer to a user. A display may be a single-screen display or a multi-screen display, referred to as a composite display. A display can encompass the touch sensitive display of one or more screens. A single physical screen can include multiple displays that are managed as separate logical displays. Thus, different content can be displayed on the separate displays although part of the same physical screen. Displays can include displays or screens on desktop computers, laptop computers, tablets, mobile devices, smartphones, etc.

The term "module" as used herein refers to any known or later developed hardware, software, firmware, artificial intelligence, fuzzy logic, or combination of hardware and software that is capable of performing the functionality associated with that element.

The term "camera" or "image capture device," as used herein can refer to an optical instrument, device, software, hardware, etc. that can record still or moving images and can store, transmit, manage, etc. those images. The camera can include one or more of an aperture, a lens, camera media, an image sensor, a processor, memory, etc. that enable the capture of the image.

The term "aperture" as used herein can refer to any hole or an opening through which light travels and that may allow the capture of images by a camera.

The term "lens" as used herein can refer to any optical lens or assembly of lenses used in conjunction with a camera to make images on a media capable of storing an image chemically or electronically.

The term "camera media" or "media" as used herein can refer to any film or electronic sensor capable of recording an image provided through a lens and/or an aperture.

The term "image sensor" as used herein can refer to the electronic sensor capable of recording an image provided through a lens and/or an aperture.

The term "video conference" as used herein can refer to any interaction between two or more people over a computer and/or communication network that involves the exchange of video data, and possibly audio data, of the participants.

The term "local user" as used herein can refer to the person(s) viewing the image of the distant user(s) on a device, which sends image data of the local user(s) to the distant user(s).

The term "distant user" as used herein can refer to the person(s) viewing the image of the local user(s) on another device, which sends image data of the distant user(s) to the local user(s). The device of the distant user may be remotely located from the device of the local user. Further, the device of the distant user and local user may communicate over a computer and/or communication network.

The term "focal point" as used herein can refer to the location on the distant user's image where the local user focuses or appears to focus. Generally, the focal point is a location substantially midway between pupils of the eyes of the distant user. Wherein, the lens of the camera can be located in physical proximity to the focal point to create "eye contact." Locating the lens can be accomplished by moving the lens onto/over the distant user's image or moving the distant user's image over the lens.

It shall be understood that the term "means," as used herein, shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Presented herein are embodiments of an eye contact enabling device. The device can be included with or added to a computing system. The eye contact enabling device can include one or more cameras, or lenses, that are configured to adjust the outgoing image of a person on a video conference such that the person appears to be making eye contact with the party receiving the image. Further, the device can receive and adjust a received image of a person participating in the video conference to facilitate eye contact with the user of eye contact enabling device. The overall design and functionality of the eye contact enabling device provides for an enhanced user experience making the video conference more interactive, more natural, easier to use, and more effective.

Figure 1A:
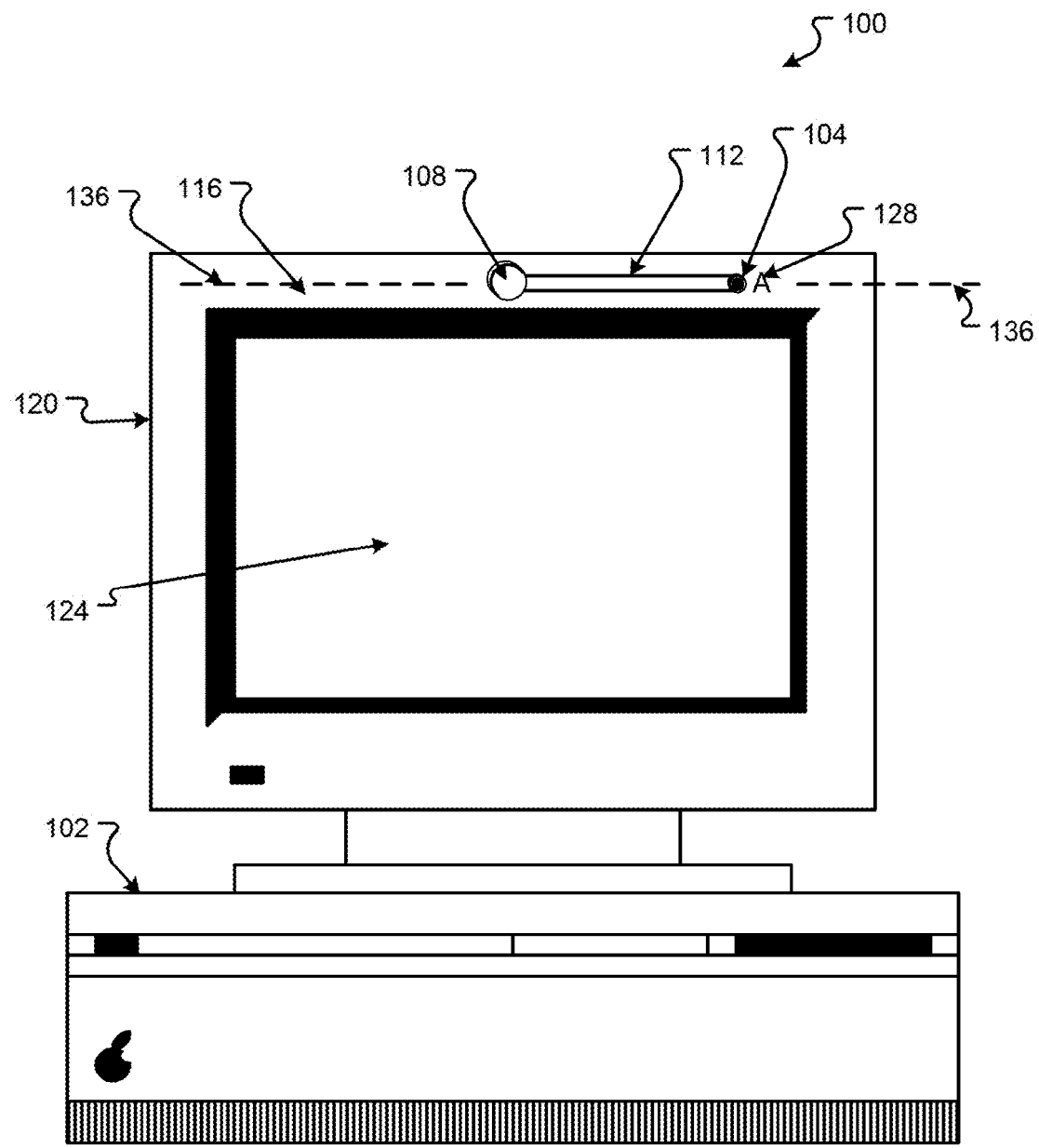
FIG. 1A includes a first view of an embodiment of an adjustable camera lens.
Figure 1B:
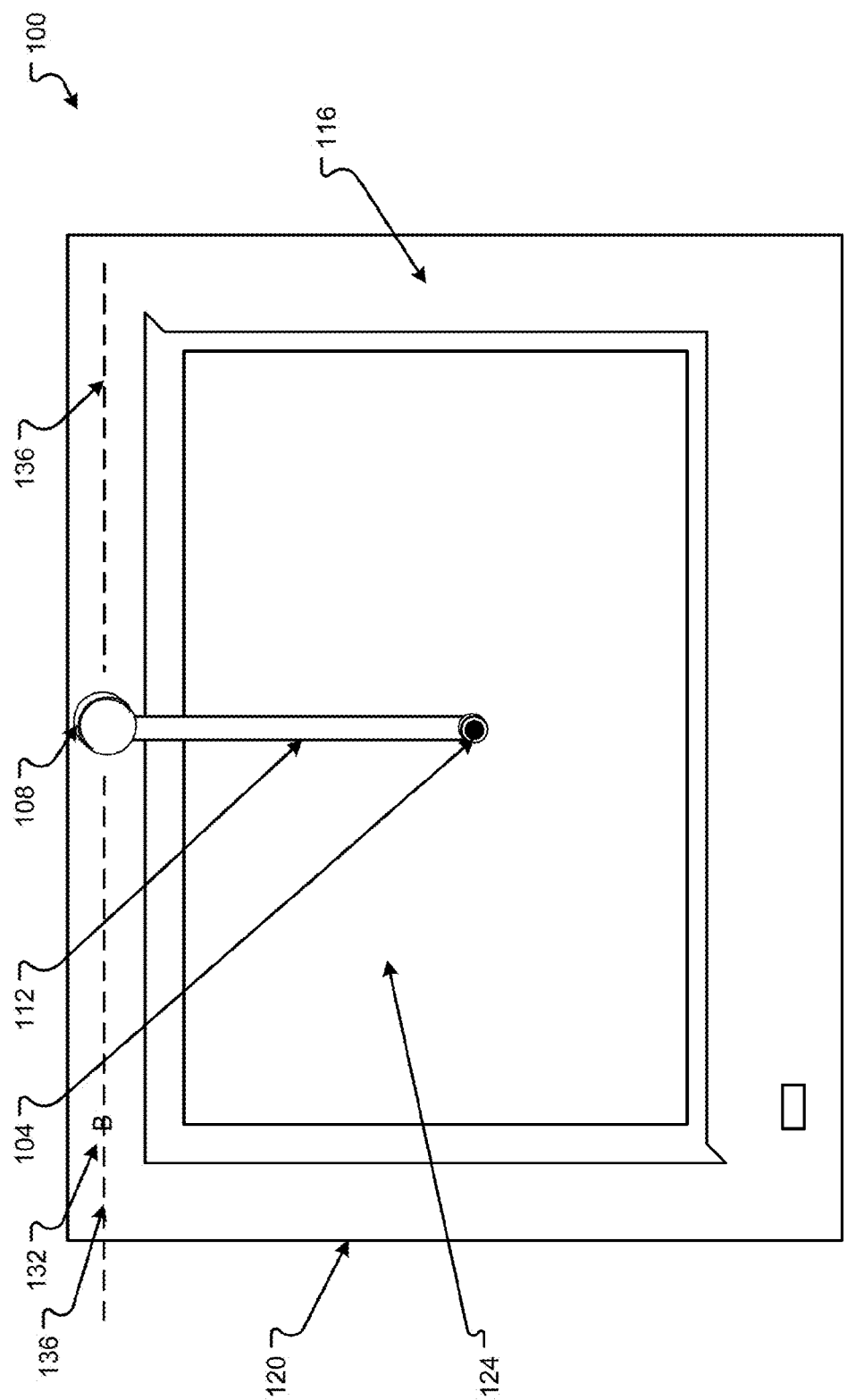
FIG. 1B includes a second view of an embodiment of the adjustable camera lens.
Figure 1C:
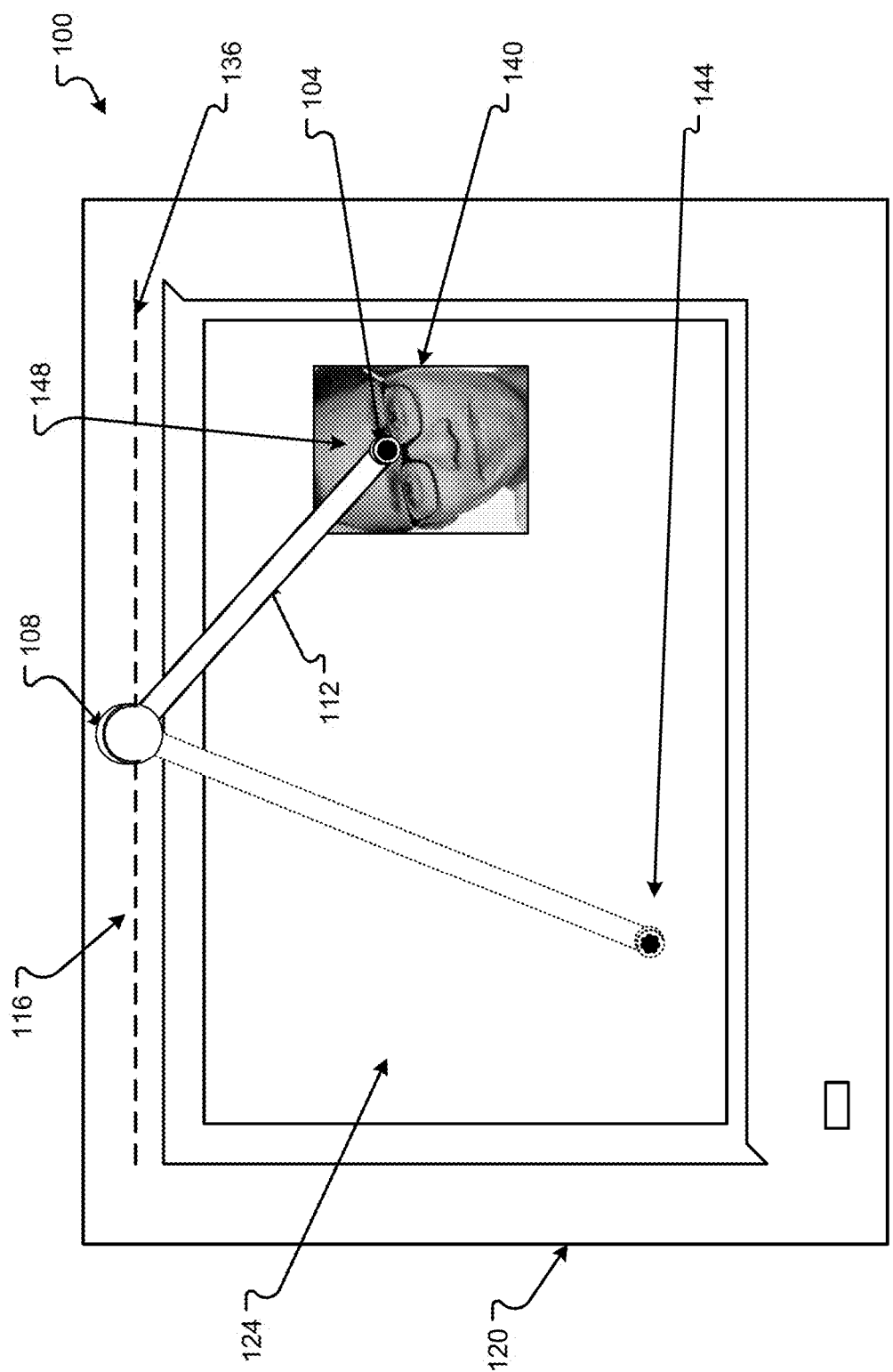
FIG. 1C includes a third view of an embodiment of the adjustable camera lens.

An embodiment of an adjustable video camera system 100 for a computer system 102 is as shown in FIGS. 1A through 1C. The adjustable video camera system 100 can include a lens 104 connected to a hub 108 by an arm or armature 112. The camera lens 104 can be any type of lens used for live capture video and that can communicate with a video processor and/or video driver of the computer system 102. These types of video cameras can include or may be similar to, for example, the LOGITECH® HD Webcam C310, the MICROSOFT LifeCam HD-3000 Webcam, etc. The computer system 102 can include any computer, laptop, tablet, mobile device, etc., such as those examples and/or embodiments explained in conjunction with FIGS. 9 and 10.

Figure 2:
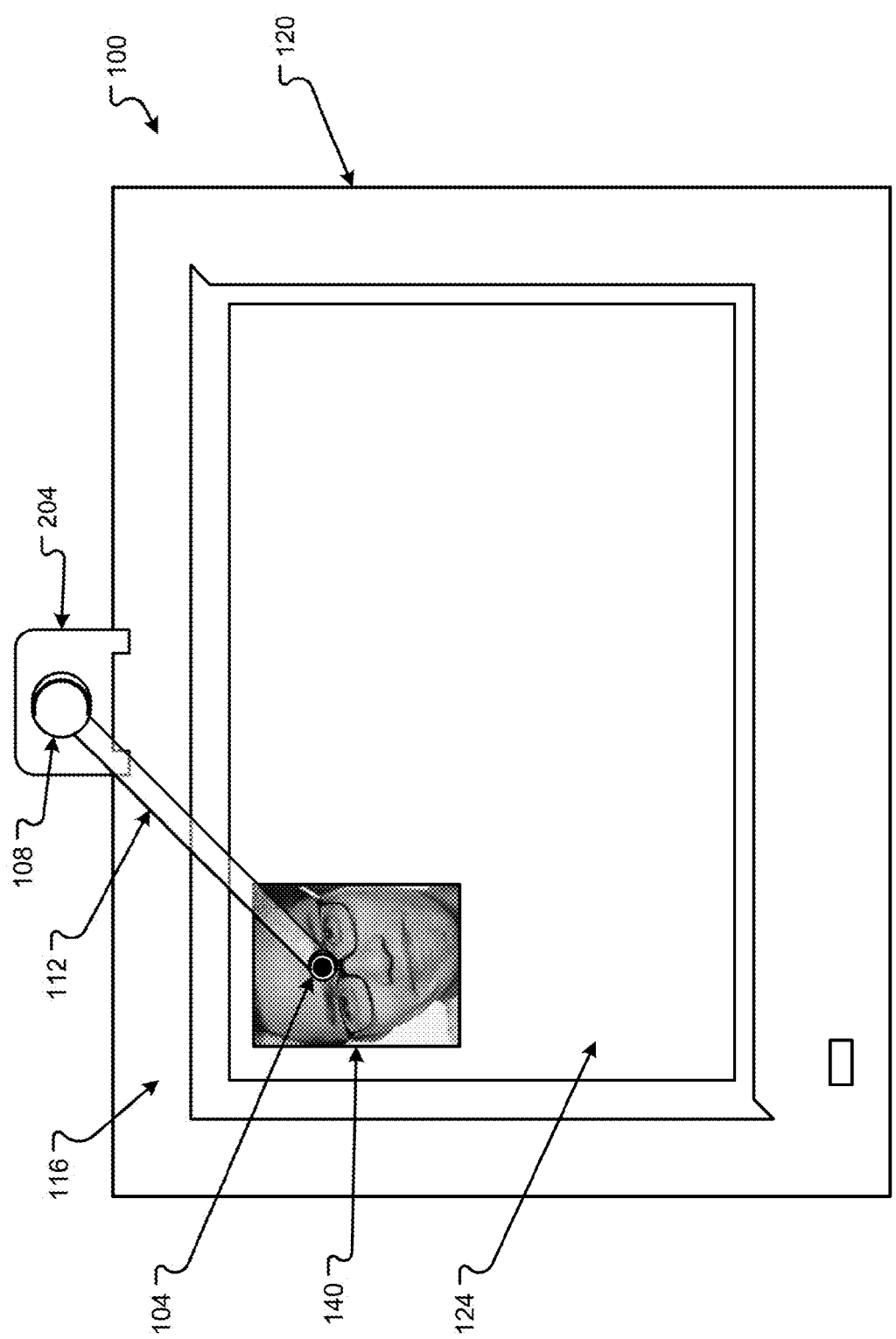
FIG. 2 includes a view of another embodiment of the adjustable camera lens.

The hub 108 may be a type of physical connection that may pivot on a pivot point located within the frame 116 of the monitor 120 or on a mount, as shown in FIG. 2. The monitor 120 may have a display surface 124 where images for icons, desktops, windows, and/or other content may be shown or displayed. The hub 108 can pivot within some range of motion. That range of motion may include a 180° degree arc from point A 128 to point B 132 (shown in FIG. 1B). The bounds of the arc—whether 180° or some more acute angle—may be denoted and controlled by limit switches. As such, if a limit switch is triggered with the armature at point A, a hardware interrupt may be send to the computer processor and/or hub to stop rotation. A similar trigger may occur at another point over the display area 124, such as when the armature is at the position shown in FIG. 1B, which may be the simplest implementation. The two points A 128 and B 132 may be along a plane 136 that protrudes from and is parallel with the top section of the frame 116 of the monitor 120. By pivoting the hub 108, the arm 112 swings the camera 104 through the display area 124. As such, the hub 108, by pivoting about the pivot point, can position the lens 104 within some part of the display area 124 and can hold or position the lens 104 over a displayed image displayed in the display area 124. For example, the image 140 of a person in a video conference may be presented in the display area 124. The hub 108 may pivot to swing the lens 104 on top of the image 140, as shown in FIG. 1C. The lens 104 may be positioned at some point over the image 140 such that, as the user watches or views the image 140, the lens 104 is positioned within the line of sight of the viewer of the image 140.

The arm 112 may be rigid and provide a fixed distance between the hub 108 and the lens 104. In other situations, the arm 112 may be extendable, by having a telescoping member coupled to the hub, such that the lens 104 may be positioned within any region of the display surface 124. For example, the arm 112 may be telescopic and can extend along some range of motion from a first point to a second point. For example, arm position 144 shows the boom arm extended along a direction and distance where the extension is longer than that shown in position 148. Thus, the lens 104, when extended to position 144, may reach an area of the display surface 124 that would not be reached by the arm 122 shown in configuration 148.

Another embodiment of the adjustable camera lens device 100 is shown in FIG. 2. In this example, the hub 108 is positioned on a gantry or other type of mount 204. This mount 204 may be attached to or placed upon the display 120. The mount 204 can be attached to the frame 116 if required or may simply sit or be held on top of the frame 116. The arm 112 may extend further than that shown in FIGS. 1A and 1B as the hub is in a position higher above the display 120. The arm 112 may be rotated along hub 108 to any position within the display surface 124 as explained in conjunction with FIGS. 1A-1C. The configuration of the arm 112, hub 108, and lens 104 may be different based on the situation, mounting type, mounting location, etc. and the requirement to extend the camera lens 104 over the display surface 124.

In some situations, the rotation of the lens 104 and arm 112 around the hub 108 may be manual and may be conducted by a user. In other situations, a servo motor or some other electromechanical device may automatically rotate the hub 108 and/or extend the arm 112 by a signal sent from a driver executed by a processor of the computer system 102. The servo motor may be further controlled by one or more signals that are sent by limit switches to the processor to begin or stop the motion of the camera device 100 or detect the position of the lens 104.

The lens 104 may be optically connected to and/or electrically connected to and/or in communication with the video processing function of the computer system 100. For example, the lens 104 may optically connect with the computer system 100 through the hub 108 by a light pipe that extends through the arm 112 into the bracket 204 or frame 116 of the computer 102. The light pipe can carry an image or visual data, associated with a captured image, to an image-sensing device that can transform the light signals into electrical signals. In other configurations, electrical signals may be sent by wire or wirelessly from an image sensor, in physical proximity with the lens, to the camera processor and/or to the computer system 102.

Figure 3:
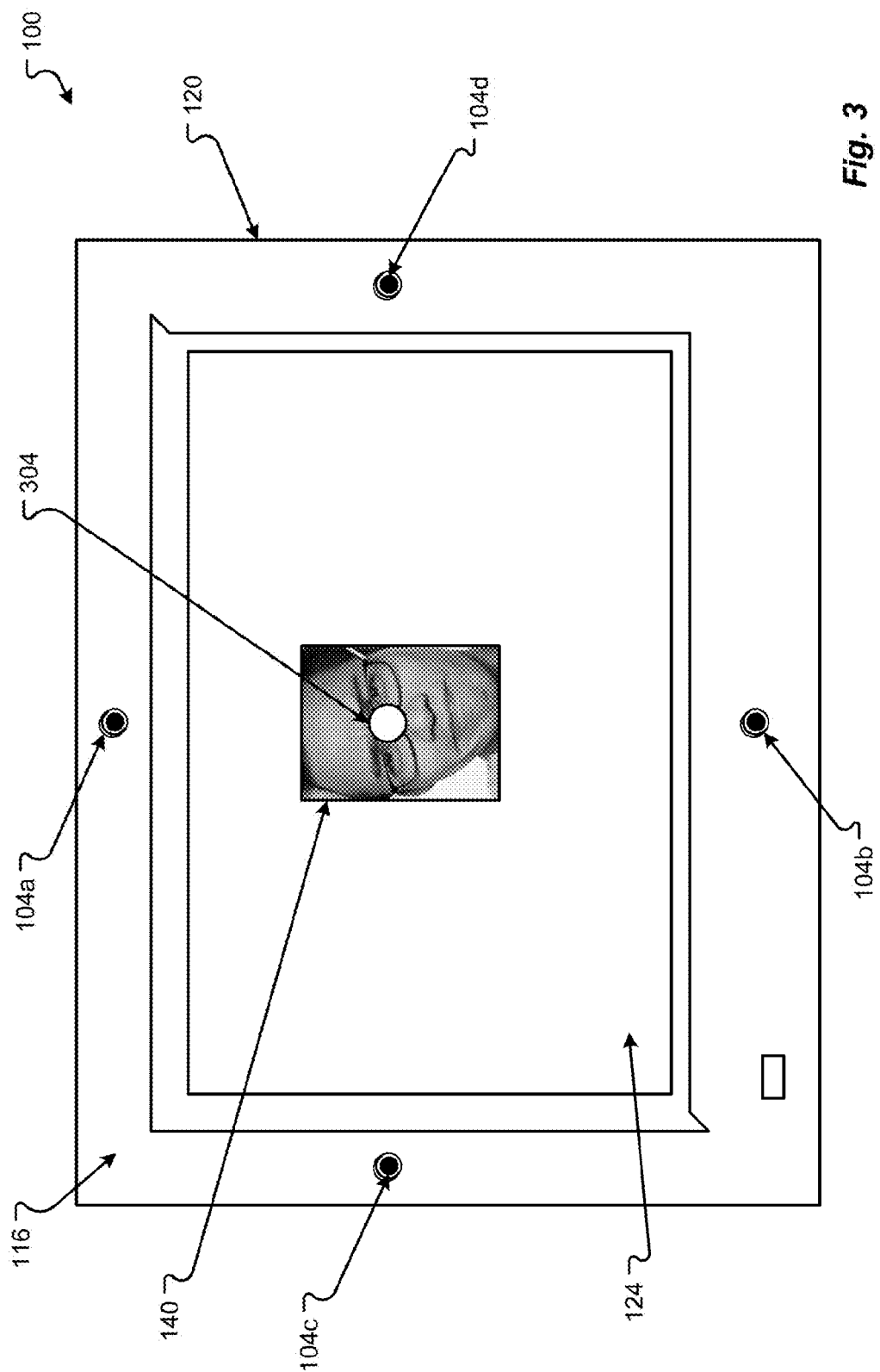
FIG. 3 includes a view of another embodiment of the adjustable camera lens.

Another system for acquiring an image for video conferencing is shown is FIG. 3. Here there may be one or more cameras 104a, 104b, 104c and/or 104d. The system 100 may include at least two camera lenses 104a-104d situated at some distance apart. For example, the system 100 shown in FIG. 3 may provide camera lenses 104a and 104b to take two images simultaneously of the person participating in the video conference. In other configurations, the two camera lenses may be 104c and 104d that are aligned horizontally rather than vertically. However, any arrangement of two or more lens 104 may be used to capture two images substantially simultaneously (e.g., within milliseconds or microseconds). Any arrangement of the one or more camera lenses 104a through 104d may be provided to acquire two simultaneous and complete images of the person conducting or participating in the conference and viewing the image 140 on the display area 124. The two images may then be adjusted to create a composite image through video processing such that the center or focus of the person appears to be facing or looking at a "virtual lens" 304 that is "positioned" over the image 140. The virtual lens 304 is logical representation. The virtual lens 304 is the focal point of the composite image created by mixing portions of the two or more acquired images that changes the image of the person looking at the screen 120 such that the person appears to be looking at or focused on the image 140.

The modification is done by taking and adjusting the at least two simultaneously acquired images to create a composite image. It may also be possible to combine the two or more images into a three dimensional image. As the pairs of lens provide a type of "stereoscopic" view of the person, it is possible to use the two images to create a three dimensional image that may be provided to the distant user. The three dimensional image could provide even better interaction during the video conference.

Figure 4:
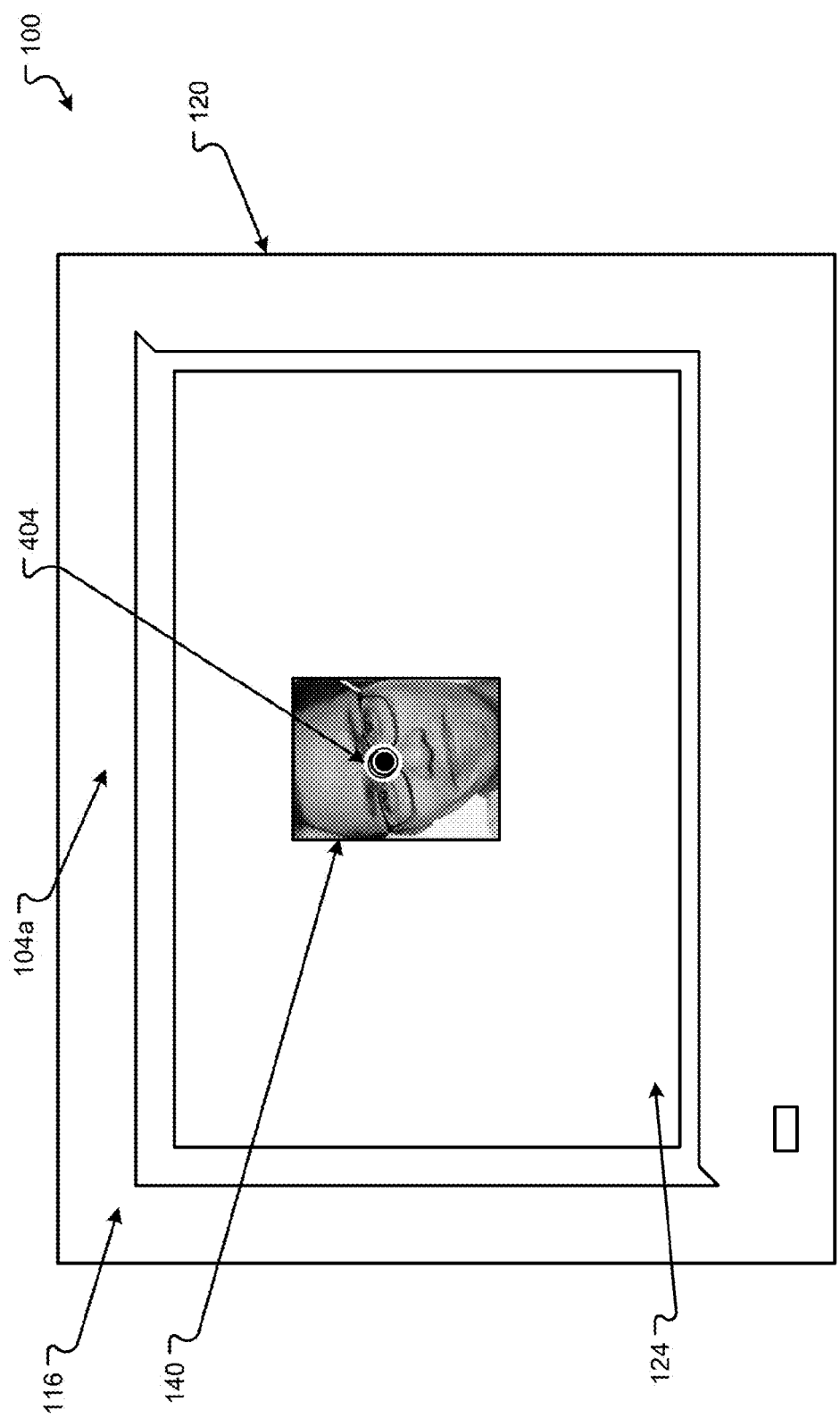
FIG. 4 includes a view of another embodiment of the adjustable camera lens.

Another embodiment of the camera system 100 is shown in FIG. 4. Here, an embedded camera lens 404 may be placed or built into the display 120 at some point within the actual display area 124. The embedded camera lens 404 may include a portion of display pixels (which may include or encompass the hardware, e.g., light emitting diodes (LEDs), used to illuminate the pixels) or display surface that is open and a camera lens inserted therein, or may be behind the plane of the display pixels, which are synchronously blanked to allow both capturing images and displaying pixels. In other configurations, the opening may include only a small fiber optic piece that can provide an image to a lens or video capture device that is behind the display layer of the display area 124. The embedded camera lens 404 may be placed anywhere within the display surface 124 but is shown in the center of the display surface 124 for purposes of illustration. The location of the embedded camera lens 404 may be known to the computer system 100 and thus allow the computer system 100 to adjust the image 140 location or format to place the image 140 over the embedded camera lens 404.

Figure 5:
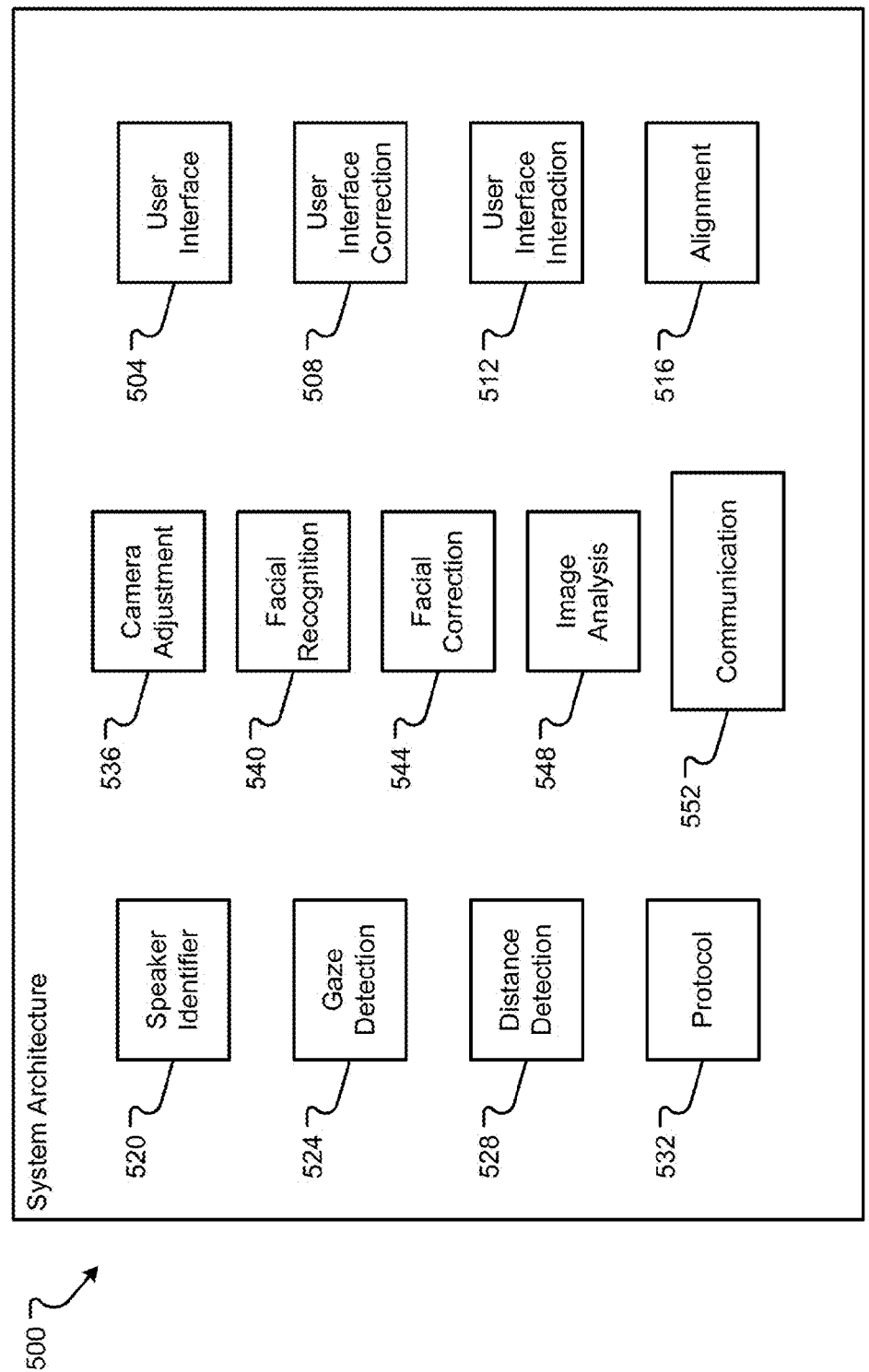
FIG. 5 is a block diagram of an embodiment of the adjustable camera lens software and/or firmware.

An embodiment of the software, firmware, and/or hardware 500 for conducting the processes described herein may be as shown in FIG. 5. The system 500 can include one or more modules, which may be hardware, software, and/or a combination of hardware and software. The system 500 may be executed by a processor, an Application Specific Integrated Circuit (ASIC), a Field Programmable Gate Array (FPGA), or other specially designed hardware. The system 500 may be executed by one or more processors within the computer system 100 and/or some of the functions may be executed by a separate computer system that is connected through a network or other connection to the local computer system 100. The modules included within the system 500 may include one or more of, but are not limited to, a user interface module 504, a user interface correction module 508, a user interface interaction module 512, an alignment module 516, a speaker identifier module 520, a gaze detection module 524, a distance detection module 528, a protocol module 532, a facial recognition module 540, a facial correction module 554, an image analysis module 548, a communications module 552, and/or a camera adjustment module 536. Each of these modules will be described in more detail hereinafter.

The user interface module 504 may be any module or object that can create, construct, or render a user interface 124 that may be displayed on the screen 120. Thus the user interface module 504 is operable to render the display images of the one or more windows, including the face or image received from the distant user in a video conference. Thus, the user interface module 504 can provide the image 140 as shown in FIGS. 1A through 4.

The user interface correction module 508 may be operable to change the location, format, or other parameters of the image 140 provided to the display area 124. The user correction module 508 may move the image automatically to center the image 140 over a lens 104 during a video conference. The changing of the display by the user correction module 508 becomes important for the embedded lens 404 in cases where the embedded lens 404 cannot move to adjust the location of the image capture. As such, the user correction module 508 can move the image 140 such that the image 140 locates the lens 404 between the eyes of the person in the image 140. Then, the image captured of the user viewing the image 140 appears to be looking at the person in the image 140.

The user interaction module 512 may provide information or receive input from the user when conducting a video conference or other action requiring video capture from the lens 104, 404. The user interaction module 512 can provide messages to the user to move the arm 112 or rotate the hub 108 to place the lens 104 onto or in front of the image 140 shown on the display surface 124. Further, the user interaction module 512 may also receive input from the user to move the image 140 to a different spot in the display 124 and thus require automatic or manual movement of the lens 104 to center the lens 104 on the image 140. The interactions between the user and the user interaction module 512 may be conducted through windows shown on another part of the display 120, through a separate display, or through some other interaction.

The alignment module 516 may determine how to align the image 140 to center that image over the lens 404, 104. The alignment module 516 may receive information from the image analysis module 548 to determine a best spot for the lens 404, 140. The ideal placement of the lens 404, 104 within the image 140 may then be analyzed for a physical location by the alignment module 516 and then the alignment module 516 can determine how to move the lens 104 onto the physical location. In other situations, the alignment module 516 can move the image 140 such that the center or focal point of a person's gaze is upon the lens 104, as the image 140 is placed over the location of the embedded lens 404, or at the location of lens 104. As such, the alignment module 516 can move the image or the lens 104, 404 to ensure that the gaze of the user, as provided by the gaze detection module 524, is upon the lens 104, 404.

A speaker identifier module 520 can identify which speaker within a room of multiple speakers is currently talking. For example, the speaker identifier module 520 can locate the source of any audio provided within a room. As such, the user who is currently communicating with the distant person, represented by image 140, may be analyzed correctly to ensure that their gaze is upon the lens 104, 404. The speaker identifier module 420 can provide the speaker information to one or more of the other modules to change or correct the analysis of the other modules in centering the image 140 or the lens 404, 104 onto the gaze of the current speaker.

The gaze detection module 524 can analyze one or more items of an image being captured by the lens 104, 404. In particular, the gaze detection module 524 can analyze the orientation of the eyes of a user to determine where the user is looking. As such, the gaze detection module 524 can analyze the pupil locations to determine upon which spot the user is currently gazing and then may provide this information as a virtual location to the alignment module 516. This virtual location may then be used by the alignment module 516 to move the lens 104 or the image 140 to focus the gaze onto the image 140.

The distance detection module 528 may use one or more sources of information from sensors or from the lens or lenses 104, 404 to determine how far away the speaker is from the screen 116. The distance detection module 528 can use, for example, the focus setting of the lens 104, 404 to determine the distance away the user is from the screen 116. In other configurations, the distance detection module 528 may use a type of triangulation between the two or more lenses 104a through 104d to determine the distance the user is from the screen 116. This distance may then be provided to the gaze detection 524 or other modules to better analyze or determine upon where the speaker or user is focusing their eyesight.

A protocol module 532 may be any module that conducts a video conference under a certain protocol. This protocol module 532 can provide rules or change communication settings for the video conference and provide that information to any of the other modules, including the communication module 552.

The facial recognition module 540 may be any module that can identify the face of a user speaking into the screen 120 and being captured by the lens 104, 404. The facial recognition module 540 allows for the lens 104, 404 to better focus onto the appropriate speaker and to provide information to one or more of the other modules for identifying the gaze or the focal point of the user's attention. The facial recognition software may be, for example, FaceSDK sold by Luxand or other types of software.

The facial correction module 544 may be any software that can adjust the image being sent to the distant user. For example, the facial correction module 544 may take two or more simultaneous images from cameras 104a through 104d and make a composite image that appears to be looking at the user represented by the image 140 shown on screen 120 in FIG. 3. As such the facial correction module 544 can adjust the actual output of the computer processor to the distant user through the communication module 552. The adjustments can reorient the video or images to provide a composite image that may be sent to the distant user.

The image analysis module 548 can analyze any image 140 received by the processor such that that image 140 may then be adjusted or moved to a more appropriate location to conduct the video conference. For example, the image analysis module 548 may determine a central point within the image 140 upon which to center that image 140 over the lens 404, as shown as FIG. 4. In other configurations, the image analysis module 548 can locate a dark area or a set of pixels that have a color that will obscure where the lens 404 is located. As the lens 104, 404 may appear as a small pinhole in the display area 124, the image analysis module 548 may analyze the image such that pixels that will obscure that pinhole can be placed over the pinhole and thus appear to hide where the embedded lens 404 is located.

The image analysis module 548 may also determine the best pixels within an area having spatial proximity to the central focal point of the image 140. The determination of the best pixels may be conducted such that a range around the center of the image or focal point of the image 140 may be analyzed for appropriate pixels and then the image moved to the best pixels within that range. The pixels at that location may be blanked on the display or may be rapidly turned on and off, allowing an image to be captured when the pixels are turned off. For example, a person in an image may be wearing glasses with dark colored frames. However, the lens location may be slightly above the location of the frames of the glasses in the image. If the image is moved slightly, such that the lens or focal point is within the location of the frame of the glasses in the image, the lens may be less noticeable.

The communication module 552 can be any module that communicates the video or receives video during the video conference. The video conferencing information may then be provided to the other modules for analysis. Further, the communication module 552 can also receive video information from one of the other modules and then send the information to the distant user that is participating in the video conference.

The camera adjust module 536 can receive information from the other modules and then mechanically move the camera lens 104, by rotating hub 108 or by extending the arm 112. Thus, the camera adjust module 536 can control the positioning of the lens 104 onto the display surface 124. The positioning commands may include simply providing a desired lens location, in which case the hub 108 and arm 112 may automatically adjust to place the lens 104 upon that location. In other configurations, the camera adjust module 536 can provide an amount (e.g., in degrees) of rotation for the hub 108 and/or an amount (e.g., in millimeters, inches, etc.) of extension for the arm 112.

Figure 6:
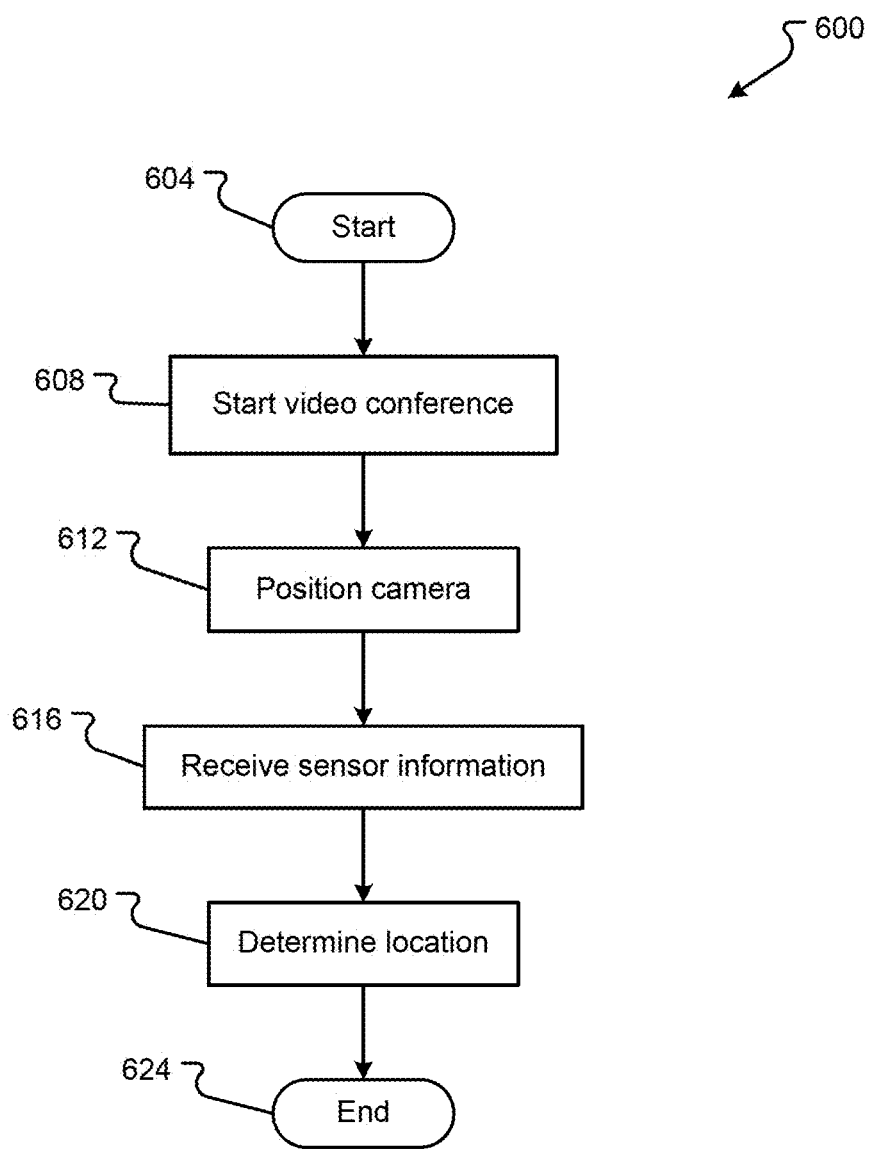
FIG. 6 is a flow diagram of an embodiment of a method for adjusting a camera lens.

An embodiment of a method 600 for positioning the lens of the camera 104 onto the display surface 124 is shown in FIG. 6. While a general order for the steps of the method 600 is shown in FIG. 6, generally, the method 600 starts with a start operation 604 and ends with an end operation 624. The method 600 can include more or fewer steps or can arrange the order of the steps differently than those shown in FIG. 6. The method 600 can be executed as a set of computer-executable instructions, executed by a computer system, and encoded or stored on a computer readable medium. Further, the method 600 can be executed by a gate or other hardware device or component in an Application Specific Integrated Circuit, a Field Programmable Gate Array, or other type of hardware device. Hereinafter, the method 600 shall be explained with reference to the systems, components, modules, software, data structures, user interfaces, etc. described herein.

The computer system 102 can receive input that indicates a video conference is about to or has started. For example, a user may enter a command through a user interface device, e.g., a mouse or keyboard, to start a video conference. In other situations, the computer system 102 may receive a signal, through a communications interface, over a network, and from another computer system, indicating a video conference is beginning. The indication or signal indicating a video conference is starting can cause the computer system 102 to configure the system 100 to conduct a video conference. Upon starting the video conference, the communications interface 552 can receive the image or video of the distant user, in step 608, to start the video conference.

The communications interface 552 can send the video for the video conference to the user interface module 504 and the camera adjust module 536. The user interface module 504 can provide an indication to the camera adjust module to indicate the position of the video or image, of the distant user, upon the screen 124. This information may indicate a grid location or coordinates for the face 140, or a specific part of the face 140, on the screen 124. The camera adjust module 536 may then, based upon the information sent from the user interface module 504, determine where the camera lens 104 needs to be positioned. Upon determining the location, the camera adjust module 536 may send one or more commands to move automatically the camera lens 104 by extending the arm 112 or rotating the hub 108 to position the camera head upon the proper coordinates. Additionally or alternatively, the camera adjust module 536 may send, to the user, a user interface, including instructions for the user, to have the user manually adjust the camera. In this case, the camera adjust module 536 may provide a visual indicia on the screen 124 where the camera lens needs to be put. The user then may manually extend the arm 112 or rotate the hub 108 to place the camera lens 104 upon the position indicated. In other situations, the camera lens 104 may be fixed into or onto the screen. And, the image 140 of the distant user may be moved or positioned over or under the fixed lens 104 at the point at which the camera is located. In other additional or alternative embodiments, the coordinates or location may be realized by an x position on a horizontal rail and a y position on a vertical rail. A camera lens 104 mounted upon the rails could be positioned over the screen based on the x position and the y position.

The camera may be positioned manually or automatically by the camera adjust module 536, in step 612. The camera adjust module 536 may then provide coordinates for a location of the lens 140 positioned over the screen 124. This lens location information may then be provided to the alignment module 516. The lens location information, provided by the camera adjust module 536, may be derived from a series of sensors, such as stop limit sensors or other types of sensors that can indicate the location of the lens. The alignment module 516 may receive the sensor information, in step 616. Based upon the information, the alignment module 516 may determine the location of the lens 104 over the screen 124, in step 620. This lens location may be a coordinate within the screen 124 of the determined location of the sensor or lens 104. The lens location information may then be provided to a user correction module 508 to move the image 140 onto a spot such that the lens is positioned between the eyes of the image 140 in the screen 124.

Figure 7:
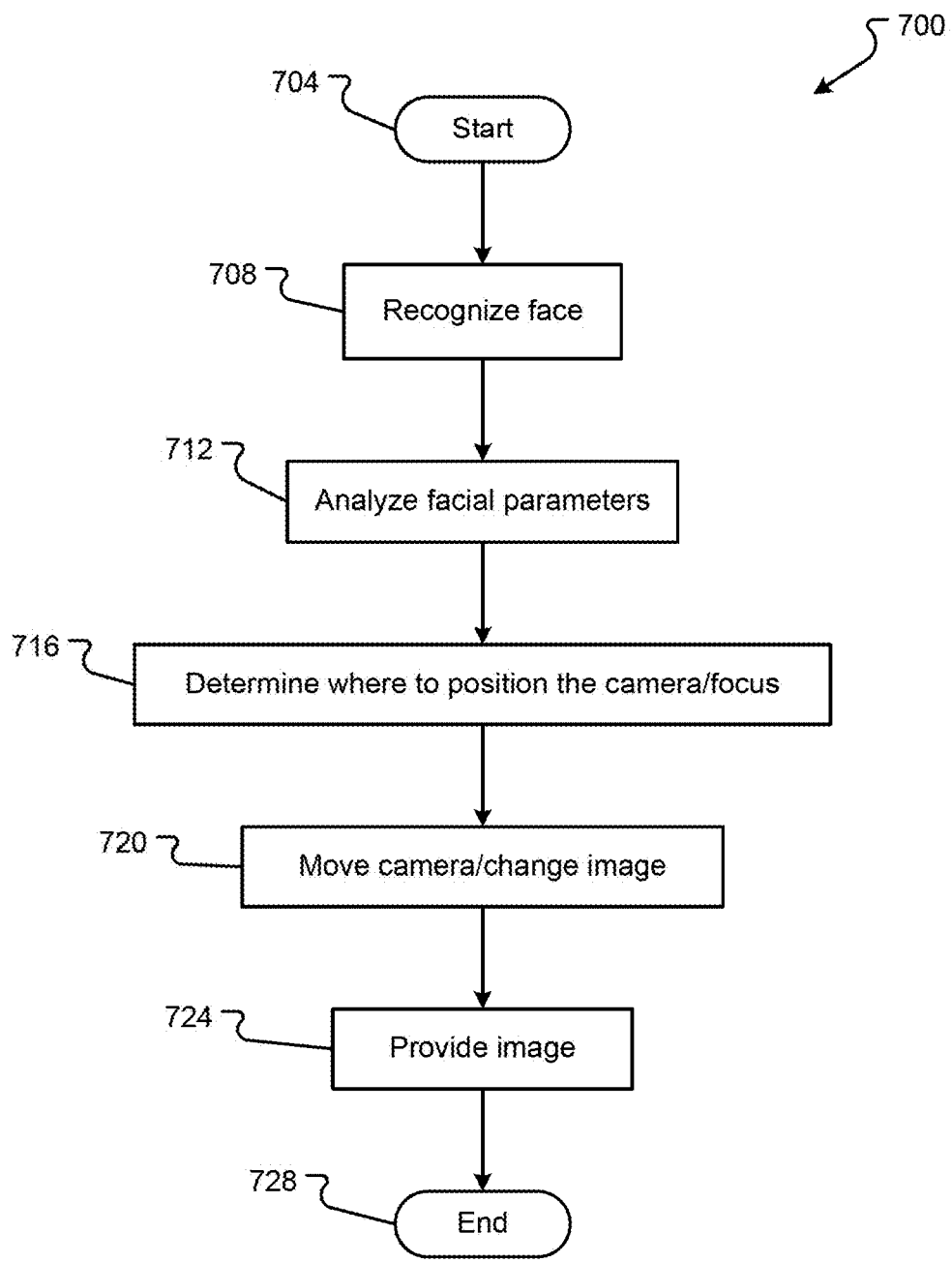
FIG. 7 is a flow diagram of another embodiment of a method for adjusting a camera lens.

An embodiment of a method 700 for providing an image of a user in a video conference is shown in FIG. 7. While a general order for the steps of the method 700 is shown in FIG. 7, generally, the method 700 starts with a start operation 704 and ends with an end operation 728. The method 700 can include more or fewer steps or can arrange the order of the steps differently than those shown in FIG. 7. The method 700 can be executed as a set of computer-executable instructions, executed by a computer system, and encoded or stored on a computer readable medium. Further, the method 700 can be executed by a gate or other hardware device or component in an Application Specific Integrated Circuit, a Field Programmable Gate Array, or other type of hardware device. Hereinafter, the method 700 shall be explained with reference to the systems, components, modules, software, data structures, user interfaces, etc. described herein.

The system 500 can receive the video image 140 for the video conference at the image analysis module 548. The image analysis module 548 can determine the limits of the face 140 or use facial recognition to determine a center position between the eyes that would elicit eye contact or appear to elicit eye contact with the image. Thus the image analysis 548 and the facial recognition 540 modules can recognize the face 140 of the image being provided to the system 500, in step 708. This facial recognition and image analysis module 548 can then analyze the facial parameters, in step 712, to determine a center point for the eye contact position. Image analysis module 548 can determine where the eyes of the user are and then determine a point or location between the two eyes of the image that could be a focus point for eye contact.

Once the eye contact position is determined, the eye contact position is provided to the camera adjust module 536 or to the user interface correction module 548. The eye contact position is then determined to be the position where the camera or focus should be for the video conference, in step 716. To make sure that the eye contact position is the place where the user is looking, the user interface correction module 548 may adjust the acquisition of the image of the local user. In one implementation, the camera adjust module 536 moves the camera boom arm 148 to the position, such that the lens 104 is over the eye contact position, in step 720. Thus, the camera adjust module 526 may trigger the motor in the hub 108 to move the camera lens 104 into that position. In additional or alternative embodiments, the camera adjust module 536 may provide information to the user interaction module 512 to have the user manually move the boom arm 148 to align the lens 104. In other situations, the user interface correction module 508 may move the distant user's image 140, such that the image's position 304 is over or in physical proximity to the eye contact position. For example, as shown in FIG. 3, the position 304 may indicate the eye contact position. This eye contact position is moved centrally between the two lenses 104a and 104b. In another example, the image 140 is moved over the embedded camera, such that the eye contact position is at position 404, as shown in FIG. 4.

Thus the user interaction module 512 can change the location of the image 140 and provide that image 140 in the appropriate spot over the eye contact location, in step 724. The user interface 504 provides the image and may adjust that image at times depending on if the image 140 changes or moves from its position in a frame and thus allows the system to maintain the eye contact position over the lens 104 and/or the virtual lens position 304.

Figure 8:
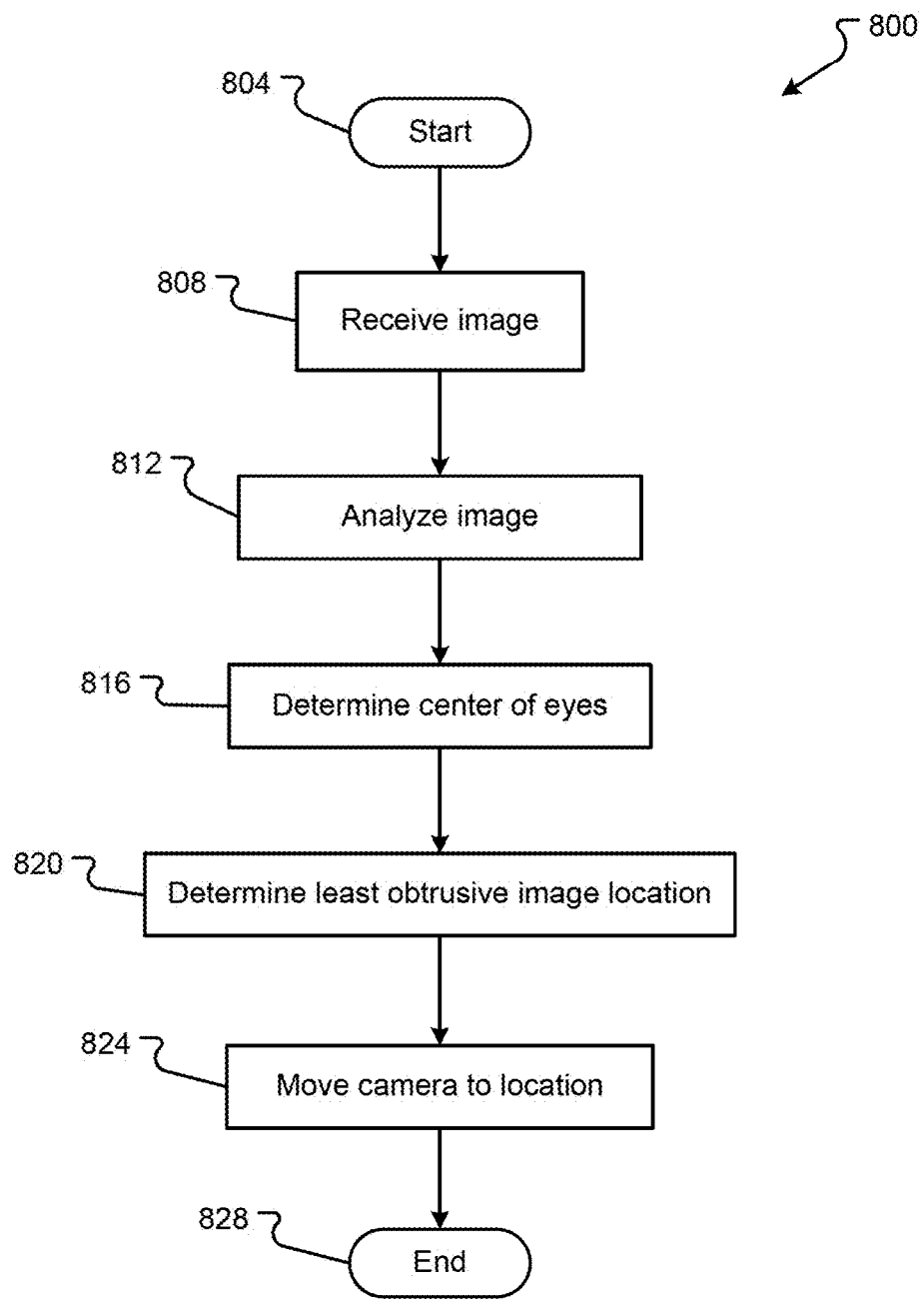
FIG. 8 is a flow diagram of another embodiment of a method for adjusting a camera lens.

An embodiment of a method 800 to move the image to a less intrusive area within the screen 124 is shown in FIG. 8. While a general order for the steps of the method 800 is shown in FIG. 8, generally, the method 800 starts with a start operation 804 and ends with an end operation 828. The method 800 can include more or fewer steps or can arrange the order of the steps differently than those shown in FIG. 8. The method 800 can be executed as a set of computer-executable instructions, executed by a computer system, and encoded or stored on a computer readable medium. Further, the method 800 can be executed by a gate or other hardware device or component in an Application Specific Integrated Circuit, a Field Programmable Gate Array, or other type of hardware device. Hereinafter, the method 800 shall be explained with reference to the systems, components, modules, software, data structures, user interfaces, etc. described herein.

The system 500 can receive an image, in step 808. The received image may be the image 140 of a user's face during a video conference. This image may be sent from the communication module 552 to the image analysis module 548 and the facial recognition module 540.

The image analysis module 548 and the facial recognition module 540 can then analyze the image, in step 812. Here, modules 540, 548 analyze the position of the face and the eyes within the face as shown in FIG. 1. The analysis of the image can determine an eye contact position for the image provided, thus the facial recognition and image analysis modules 540, 548 can determine the center point between the eyes, in step 816. This position is determined to be eye contact position and should be the focus for where the lens 104 is placed.

The image analysis module 548 may then determine the least obtrusive place to locate the image of the user. This least obtrusive image location can be a position that does not overlay other important data on the screen 124. Thus, the image analysis 548 can determine that the least obtrusive image location can be one of the four corners of the display 124 or at some place that's not over an active window.

The image may be then be moved to the least obtrusive image location by the user interface correction module 508. Upon moving the image the user interface correction module 508 can provide data back to the image analysis module 548 to re-determine the eye contact position. Upon re-determining the eye contact position 548, the image analysis module 548 can provide that information to the camera adjust module 536, in step 824. The camera adjust module 536 may then move the boom arm 112 to locate the lens 104 over the eye contact position in the new area. For example, the camera adjust module 536 can move the camera to a new position and extend the arm, as shown in FIG. 1 at location 144. The new location may be a less obtrusive area to conduct the video conference and allow the user to use the other portion of the user interface 124 to conduct other interactions or activities or to provide information for the video conference.

Figure 9:
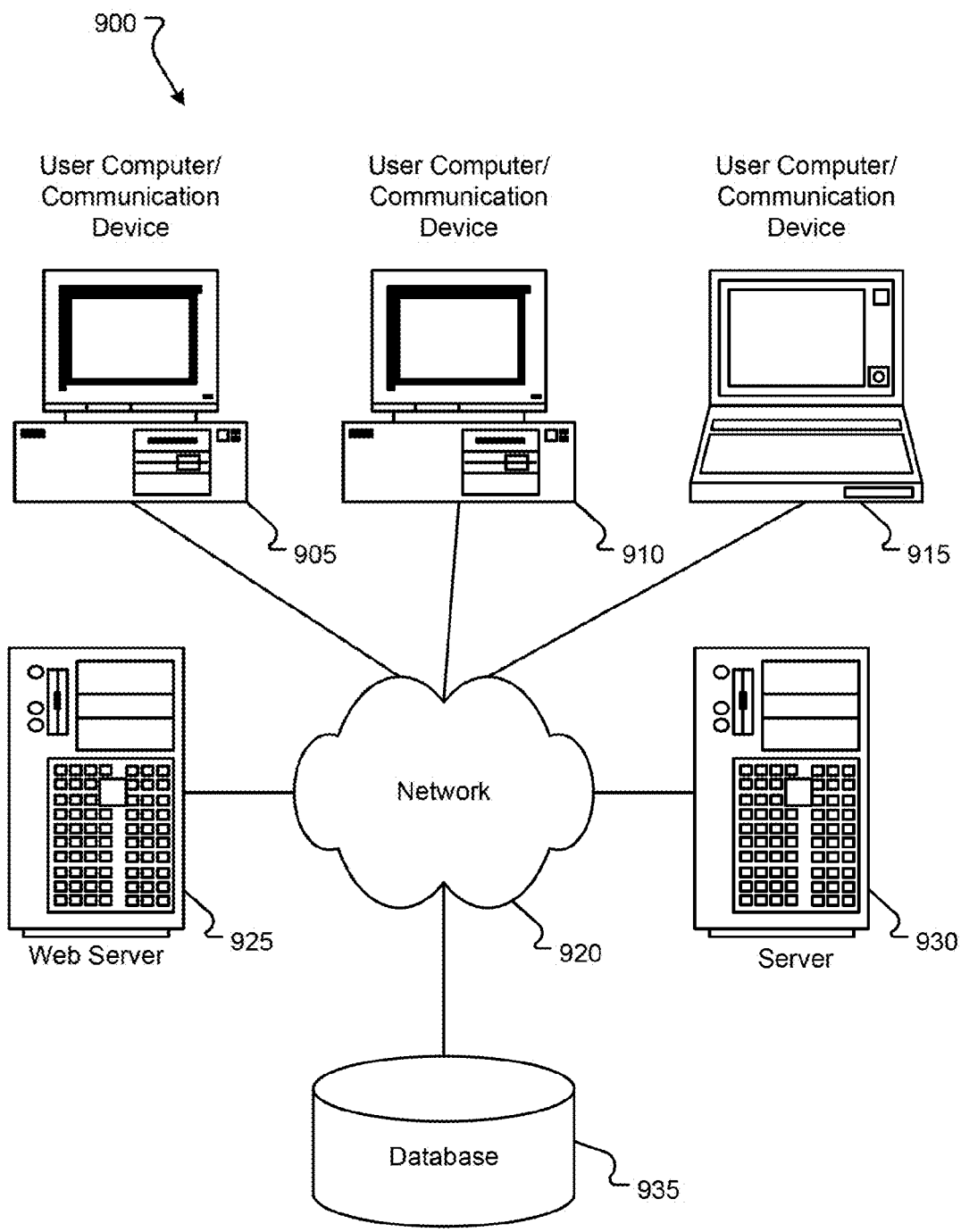
FIG. 9 is a diagram of an embodiment of a computing environment.

FIG. 9 illustrates a block diagram of a system 900 that may connect parties in a video conference. The system 900 includes one or more user computers 905, 910, and 915. The user computers 905, 910, and 915 may be general purpose personal computers (including, merely by way of example, personal computers and/or laptop computers running various versions of Microsoft Corp.'s Windows™ and/or Apple Corp.'s Macintosh™ operating systems) and/or workstation computers running any of a variety of commercially-available UNIX™ or UNIX-like operating systems. These user computers 905, 910, 915 may also have any of a variety of applications, including for example, database client and/or server applications, and web browser applications. Alternatively, the user computers 905, 910, and 915 may be any other electronic device, such as a thin-client computer, Internet-enabled mobile telephone, and/or personal digital assistant, capable of communicating via a network (e.g., the network 920 described below) and/or displaying and navigating web pages or other types of electronic documents. Although the exemplary system 900 is shown with three user computers, any number of user computers may be supported.

System 900 further includes a network 920. The network 920 may can be any type of network familiar to those skilled in the art that can support data communications using any of a variety of commercially-available protocols, including without limitation TCP/IP, SNA, IPX, AppleTalk, and the like. Merely by way of example, the network 920 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth™ protocol known in the art, and/or any other wireless protocol); and/or any combination of these and/or other networks.

The system may also include one or more server computers 925, 930. One server may be a web server 925, which may be used to process requests for web pages or other electronic documents from user computers 905, 910, and 920. The web server can be running an operating system including any of those discussed above, as well as any commercially-available server operating systems. The web server 925 can also run a variety of server applications, including HTTP servers, FTP servers, CGI servers, database servers, Java servers, and the like. In some instances, the web server 925 may publish available operations as one or more web services.

The system 900 may also include one or more file and or/application servers 930, which can, in addition to an operating system, include one or more applications accessible by a client running on one or more of the user computers 905, 910, 915. The server(s) 930 may be one or more general purpose computers capable of executing programs or scripts in response to the user computers 905, 910 and 915. As one example, the server may execute one or more web applications. The web application may be implemented as one or more scripts or programs written in any programming language, such as Java™, C, C#™ or C++, and/or any scripting language, such as Perl, Python, or TCL, as well as combinations of any programming/scripting languages. The application server(s) 930 may also include database servers, including without limitation those commercially available from Oracle, Microsoft, Sybase™, IBM™ and the like, which can process requests from database clients running on a user computer 905.

In some embodiments, an application server 930 may create web pages dynamically for displaying. The web pages created by the web application server 930 may be forwarded to a user computer 905 via a web server 925. Similarly, the web server 925 may be able to receive web page requests, web services invocations, and/or input data from a user computer 905 and can forward the web page requests and/or input data to the web application server 930.

In further embodiments, the server 930 may function as a file server. Although for ease of description, FIG. 9 illustrates a separate web server 925 and file/application server 930, those skilled in the art will recognize that the functions described with respect to servers 925, 930 may be performed by a single server and/or a plurality of specialized servers, depending on implementation-specific needs and parameters.

The system 900 may also include a database 935. The database 935 may reside in a variety of locations. By way of example, database 935 may reside on a storage medium local to (and/or resident in) one or more of the computers 905, 910, 915, 925, 930. Alternatively, it may be remote from any or all of the computers 905, 910, 915, 925, 930, and in communication (e.g., via the network 920) with one or more of these. In a particular set of embodiments, the database 935 may reside in a storage-area network ("SAN") familiar to those skilled in the art. Similarly, any necessary files for performing the functions attributed to the computers 905, 910, 915, 925, 930 may be stored locally on the respective computer and/or remotely, as appropriate. In one set of embodiments, the database 935 may be a relational database, such as Oracle 10i™, that is adapted to store, update, and retrieve data in response to SQL-formatted commands.

Figure 10:
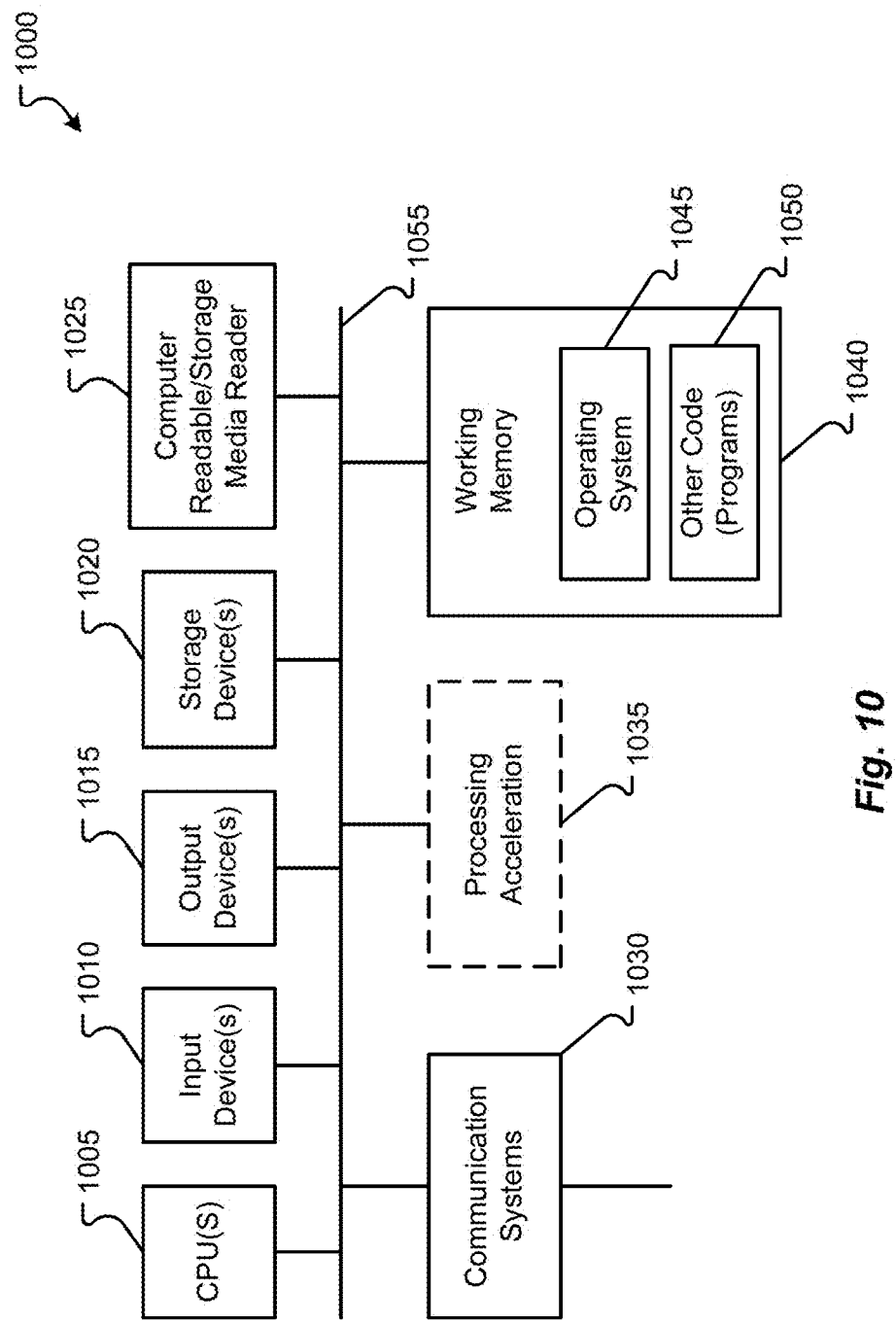
FIG. 10 is a diagram of an embodiment of a computing system.

FIG. 10 illustrates an embodiment of a computer or computing system 1000 upon which a video conference may be conducted or executed. The computer system 1000 is shown comprising hardware elements that may be electrically coupled via a bus 1055. The hardware elements may include one or more central processing units (CPUs) 1005; one or more input devices 1010 (e.g., a mouse, a keyboard, etc.); and one or more output devices 1015 (e.g., a display device, a printer, etc.). The computer system 1000 may also include one or more storage device(s) 1020. By way of example, storage device(s) 1020 may be disk drives, optical storage devices, solid-state storage device such as a random access memory ("RAM") and/or a read-only memory ("ROM"), which can be programmable, flash-updateable and/or the like.

The computer system 1000 may additionally include a computer-readable storage media reader 1025; a communications system 1030 (e.g., a modem, a network card (wireless or wired), an infra-red communication device, etc.); and working memory 1040, which may include RAM and ROM devices as described above. In some embodiments, the computer system 1000 may also include a processing acceleration unit 1035, which can include a DSP, a special-purpose processor and/or the like The computer-readable storage media reader 1025 can further be connected to a computer-readable storage medium, together (and, optionally, in combination with storage device(s) 1020) comprehensively representing remote, local, fixed, and/or removable storage devices plus storage media for temporarily and/or more permanently containing computer-readable information. The communications system 1030 may permit data to be exchanged with the network 1020 and/or any other computer described above with respect to the system 1000.

The computer system 1000 may also comprise software elements, shown as being currently located within a working memory 1040, including an operating system 1045 and/or other code 1050, such as program code implementing a web service connector or components of a web service connector. It should be appreciated that alternate embodiments of a computer system 1000 may have numerous variations from that described above. For example, customized hardware might also be used and/or particular elements might be implemented in hardware, software (including portable software, such as applets), or both. Further, connection to other computing devices such as network input/output devices may be employed.

A further embodiment of the systems, devices, and methods above may be applied to image capture with a mobile device. When capturing a close-up photograph or a "selfie," i.e., a photograph that one has taken of oneself, typically a photograph taken with a smartphone or webcam, a person typically does not look at the lens but at the screen. This habit causes the similar problems with eye contact as those described above. As such, the changes to the physical or virtual position of the one or more lenses can be made as described above, but with a mobile device. The changes would adjust the captured image to create eye contact with the picture's subject.

The exemplary systems and methods of this disclosure have been described in relation to computing systems and image capture devices. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include one or more processors, which may have a single core or multiple cores, memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the Detailed Description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for conducting a video conference comprising:
   a computing system receiving an image of a distant user involved in the video conference;
   a processor of the computing system determining a position on the image associated with a focal point of a local user involved in the video conference;
   the processor determining where the position is located on a display of the computing system;
   adjusting an acquisition of a second image of the local user to cause the local user to appear to focus on the focal point while conducting the video conference, wherein adjusting the acquisition of the second image of the local user comprises:
      obtaining a third image from a first lens of an image capture device and a fourth image from a second lens of the image capture device; and
      generating a composite image from the third and fourth images such that the composite image appears to focus on the focal point; and
   sending the composite image to the distant user.

2. The method according to claim 1, wherein the image of the distant user is of the distant user's face including eyes of the distant user.

3. The method according to claim 2, wherein the position is a location between the eyes in the face of the distant user.

4. The method according to claim 3, further comprising the processor executing a facial recognition module to determine the location.

5. The method according to claim 4, wherein the location is substantially midway between the pupils of the eyes of the distant user.

6. The method according to claim 1, wherein the first lens and second lens of the image capture device are embedded in the display of the computing system.

7. A computing system configured to conduct a video conference, the computing system comprising:
   a network connection configured to:
      receive a first image of a distant user involved in the video conference; and
      send a representation of a second image, of a local user, to the distant user;
   a display configured to display the first image;
   an image capture device configured to capture the second image;
   a processor configured to:
      determine a position on the first image associated with a focal point of the local user involved in the video conference;
      determine where the position is located on the display; and
      adjust an acquisition of the second image of the local user to cause the local user to appear to focus on the focal point while conducting the video conference, wherein adjust the acquisition of the second image of the local user comprises the steps of:
         obtain a third image from a first lens of the image capture device and a fourth image from a second lens of the image capture device; and
         generate a composite image from the third and fourth images such that the composite image appears to focus on the focal point and
      send the composite image to the distant user.

8. The computing system according to claim 7, wherein the image of the distant user is of the distant user's face including eyes of the distant user, wherein the position is a location between the eyes in the face of the distant user.

9. The computing system according to claim 8, wherein the first lens and second lens of the image capture device are embedded in the display of the computing system.

10. A non-transitory computer readable medium stored with instructions stored thereon that cause a computing system configured to execute a method for conducting a video conference, the method comprising:
   receiving an image of a distant user involved in the video conference;
   determining a position on the image associated with a focal point of a local user involved in the video conference;
   determining where the position is located on a display of the computing system;
   adjusting an acquisition of a second image of the local user to cause the local user to appear to focus on the focal point while conducting the video conference, wherein adjusting the acquisition of the second image of the local user comprises:
      obtaining a third image from a first lens of an image capture device and a fourth image from a second lens of the image capture device; and
      generating a composite image from the third and fourth images such that the composite image appears to focus on the focal point; and
   sending the composite image to the distant user.

11. The computer readable medium according to claim 10, wherein the image of the distant user is of the distant user's face including eyes of the distant user.

12. The method according to claim 1, wherein the first lens and the second lens of the image capture device are on diametrically opposite sides of the display.

13. The computing system according to claim 8, wherein the position is a location between the eyes in the face of the distant user.

14. The computing system according to claim 13, wherein the processor is further configured to execute a facial recognition module to determine the position.

15. The computing system according to claim 14, wherein the location is substantially midway between pupils of the eyes of the distant user.

16. The computing system according to claim 7, wherein the first lens and the second lens of the image capture device are on diametrically opposite sides of the display.

17. The computer readable medium according to claim 11, wherein the position is a location between the eyes in the face of the distant user.

18. The computer readable medium according to claim 17, wherein the processor is further configured to execute a facial recognition module to determine the position.

19. The computer readable medium according to claim 18, wherein the location is substantially midway between pupils of the eyes of the distant user.

20. The computer readable medium according to claim 10, wherein the first lens and second lens of the image capture device are embedded in the display of the computing system.

\* \* \* \* \*